US009225200B2

United States Patent
Liu

(10) Patent No.: US 9,225,200 B2
(45) Date of Patent: Dec. 29, 2015

(54) ELECTRONIC DEVICE WITH CONNECTION INTERFACE SUPPORTING SIGNAL COMMUNICATION AND CHARGING OPERATION

(71) Applicant: Quanta Computer Inc., Kuei Shan Hsiang, Tao Yuan Shien (TW)

(72) Inventor: Chien-Hung Liu, Tao Yuan Shien (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 444 days.

(21) Appl. No.: 13/675,500

(22) Filed: Nov. 13, 2012

(65) Prior Publication Data

US 2014/0049112 A1 Feb. 20, 2014

(30) Foreign Application Priority Data

Aug. 20, 2012 (TW) .............................. 101130073 A

(51) Int. Cl.
| | |
|---|---|
| *H02J 9/06* | (2006.01) |
| *H02J 7/34* | (2006.01) |
| *H02J 7/00* | (2006.01) |
| *G06F 1/26* | (2006.01) |

(52) U.S. Cl.
CPC . *H02J 7/34* (2013.01); *G06F 1/266* (2013.01); *H02J 7/0052* (2013.01); *H02J 9/062* (2013.01); *H02J 2007/0001* (2013.01); *Y10T 307/625* (2015.04)

(58) Field of Classification Search
CPC ... H02J 7/34; H02J 7/0052; H02J 2007/0001; G06F 1/266
See application file for complete search history.

(56) References Cited

U.S. PATENT DOCUMENTS

| 6,211,649 B1 * | 4/2001 | Matsuda ........................ 320/115 |
| 2001/0032280 A1 * | 10/2001 | Osakada et al. .............. 710/129 |
| 2003/0076243 A1 * | 4/2003 | Chen et al. ...................... 341/22 |
| 2004/0078505 A1 * | 4/2004 | Yu et al. ........................ 710/300 |
| 2007/0085516 A1 * | 4/2007 | Fenwick et al. .............. 323/234 |
| 2008/0150512 A1 * | 6/2008 | Kawano ........................ 323/351 |

(Continued)

FOREIGN PATENT DOCUMENTS

TW 201038041 A 10/2010

OTHER PUBLICATIONS

CN Office Action dated Aug. 26, 2015 in corresponding Chinese application (No. 201210322576.0).

*Primary Examiner* — Thienvu Tran
*Assistant Examiner* — David M Stables
(74) *Attorney, Agent, or Firm* — McClure, Qualey & Rodack, LLP

(57) ABSTRACT

An electronic device includes a connection interface, a voltage regulation unit, a storage unit, a charging unit, a processing unit, and a switching unit. The switching unit is coupled to the storage unit, the processing unit, and the connection interface. When the electronic device is in a power-exhaustion state and an external device having a charging function is coupled to the connection interface to provide a first supplying voltage to a power pin of the connection interface, the voltage regulation unit transforms the first supplying voltage to a first operation voltage to power the storage unit and the switching unit, and the switching unit couples the storage unit to the connection interface to transmit device information to the external device. When the external device provides a second supplying voltage to the power pin in response to the device information, the electronic device is in a charging state.

10 Claims, 6 Drawing Sheets

(56) References Cited

U.S. PATENT DOCUMENTS

2011/0018522 A1* 1/2011 Li et al. .................. 323/318
2011/0084685 A1* 4/2011 Zhong et al. ............ 324/76.11
2012/0110235 A1* 5/2012 Hsieh et al. ............. 710/316

* cited by examiner

ELECTRONIC DEVICE WITH CONNECTION INTERFACE SUPPORTING SIGNAL COMMUNICATION AND CHARGING OPERATION

CROSS REFERENCE TO RELATED APPLICATIONS

This Application claims priority of Taiwan Patent Application No. 101130073, filed on Aug. 20, 2012, the entirety of which is incorporated by reference herein.

BACKGROUND OF THE INVENTION

1. Field of the Invention

The invention relates to an electronic device which comprises a connection port capable of receiving a supply voltage and transmitting and receiving signals.

2. Description of the Related Art

Recently, portable electronic products have been developed to be lighter and thinner. However, the space available for the arrangement of input/output connection ports has thus been reduced, thereby hindering further functional expansion of the portable electronic products. For example, a conventional portable computer requires at least two connection ports: one is a DC jack which is used to receive a supply voltage to power the portable computer, and the other one is an universal serial bus (USB) through which the portable computer transmits and receives data. In other words, the supply voltage receiving operation and the data communication operation for the portable computer are performed through two different connection ports.

According to the above described, it is desired to provide an electronic device which comprises one connection port capable of receiving a supply voltage and further transmitting and receiving signals/data, thereby increasing the space available for the arrangement of input/output connection ports.

BRIEF SUMMARY OF THE INVENTION

An exemplary embodiment of an electronic device is provided. The electronic device is capable of being coupled to a first external device with a charging function. The electronic device comprises a connection interface, a voltage regulation unit, a storage unit, a charging unit, a processing unit, and a switching unit. The connection interface comprises a power pin and a first signal transmitting/receiving (T/R) pin set. The voltage regulation unit is coupled to the power pin. The storage unit is coupled to the voltage regulation unit and powered by a first operation voltage. The storage unit stores first device information of the electronic device. The charging unit is coupled to the power pin. The processing unit is coupled to the charging unit and powered by a second operation voltage. The processing unit performs a system operation of the electronic device. The switching unit is powered by the first operation voltage. The switching unit receives a selection signal, and comprises a first input terminal set coupled to the storage unit, a second input terminal set coupled to the processing unit, and an output terminal set coupled to the first signal T/R pin set. When the electronic device is in a power-exhaustion state and the first external device is coupled to the connection interface to provide a first supply voltage to the power pin, the voltage regulation unit transforms the first supply voltage to the first operation voltage, and the switching unit couples the first input terminal set to the output terminal set according to the selection signal to transmit the first device information to the first external device via the first signal T/R pin set. When the first external device provides a second supply voltage to the power pin in response to the first device information, the electronic device is in a charging state. In the charging state, the charging unit provides the second operation voltage according to the second supply voltage.

An exemplary embodiment of an electronic system is provided. The electronic system comprises a power supply device and an electronic device. The power supply device comprises a first connection interface, a first control unit, and a power switching unit. The first control unit is coupled to the first connection interface. The power switching unit is coupled to the first connection interface and controlled by the first control unit. The power switching unit selectively provides a first supply voltage or a second supply voltage. The electronic device is capable of being powered by the power supply device. The electronic device comprises a second connection interface, a voltage regulation unit, a storage unit, a charging unit, a processing unit, and a switching unit. The second connection interface comprises a power pin and a first signal transmitting/receiving (T/R) pin set. The voltage regulation unit is coupled to the power pin. The storage unit is coupled to the voltage regulation unit and powered by a first operation voltage. The storage unit stores first device information of the electronic device. The charging unit is coupled to the power pin. The processing unit is coupled to the charging unit and powered by a second operation voltage. The processing unit performs a system operation of the electronic device. The switching unit is powered by the first operation voltage. The switching unit receives a selection signal, and comprises a first input terminal set coupled to the storage unit, a second input terminal set coupled to the processing unit, and an output terminal set coupled to the first signal T/R pin set. When the electronic device is in a power-exhaustion state and the power supply device is coupled to the second connection interface via the first connection interface to provide the first supply voltage to the power pin by the power switching unit, the voltage regulation unit transforms the first supply voltage to the first operation voltage, and the switching unit couples the first input terminal set to the output terminal set according to the selection signal to transmit the first device information to the first control unit via the first signal T/R pin set. When the first control unit controls the power switching unit to provide the second supply voltage to the power pin in response to the first device information, the electronic device is in a charging state. In the charging state, the charging unit provides the second operation voltage according to the second supply voltage.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
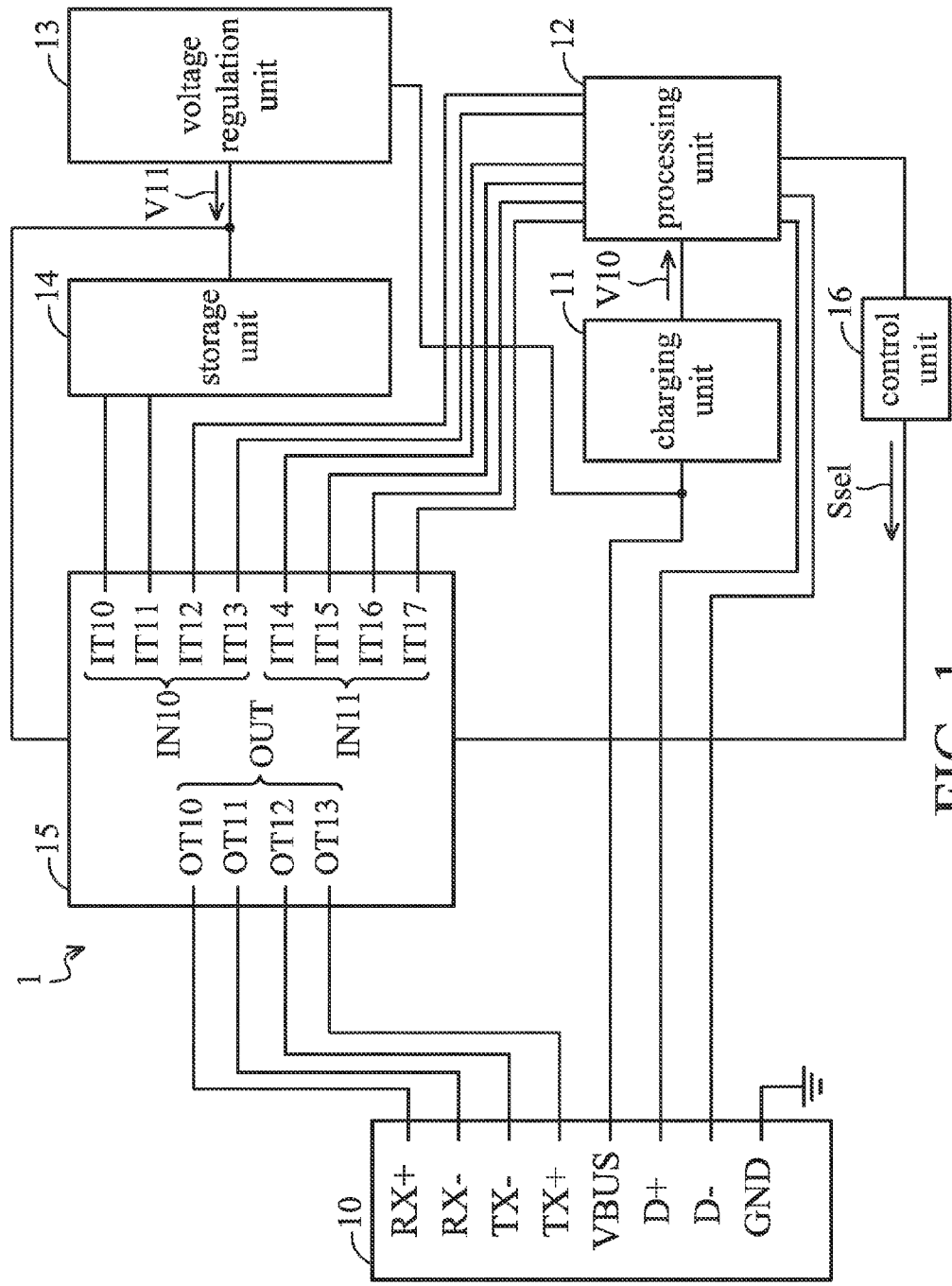
FIG. 1 shows an exemplary embodiment of an electronic system.

In an exemplary embodiment of an electronic device in FIG. 1, an electronic device 1 comprises a connection interface 10, a charging unit 11, a processing unit 12, a voltage regulation unit 13, a storage unit 14, a switching unit 15, and a control unit 16. In the embodiment, the connection interface 10 is a connection port supporting the Universal Serial Bus 3.0 (USB 3.0) transfer protocol. Thus, the connection interface 10 (USB 3.0) at least comprises two signal transmitting/receiving (T/R) pin sets and a power pin set. One signal T/R pin set comprises signal T/R pins RX+, RX−, TX+, and TX−, and the other signal T/R pin set comprises signal T/R pins D+ and D−. The power pin set comprises power pins VBUS and GND. The signal T/R pins TX+, TX−, RX+, and RX− are coupled to the switching unit 15, and the signal T/R pins D+ and D− are coupled to the processing unit 12. The charging unit 11 and the voltage regulation unit 13 are coupled to the power pin VBUS. The charging unit 11 is capable of providing an operation voltage V10 to the processing unit 12, such that the processing unit 12 can operate to perform a system operation of the electronic device 1. The voltage regulation unit 13 can transform a voltage provided by the charging unit 11 to an operation voltage V11 (such a voltage with 3.3V or 5V), and the operation voltage V11 is provided to the storage unit 14 and the switching unit 15 for operation. The storage unit 14 stores device information IFO14 (shown in FIG. 2A) of the electronic device 1, such as a product identification code (PID), a vendor identification code (VID), and/or device description. Generally, the operation voltage V10 for the operation of the processing unit 12 is higher than the operation voltage V11 for the operations of the storage unit 14 and the switching unit 15.

The switching unit 15 comprises two input terminal sets IN10 and IN11 and an output terminal set OUT10. The switching unit 15 selectively couples the input terminal set IN10 or IN11 to the output terminal set OUT10 according to a selection signal Sse1. In the embodiment, each of the input terminal sets IN10 and IN11 comprises four input terminals, and the output terminal set comprises four output terminals. The four input terminals of each of the input terminal sets IN10 and IN11 correspond to the four output terminals of the output terminal set OUT10, respectively. As shown in FIG. 1, the input terminal set IN10 comprises input terminals IT10~IT13, the input terminal set IN11 comprises input terminals IT14~IT17, and the output terminal set OUT10 comprises output terminals OT10~OT13. In an embodiment, when the selection signal Sse1 is at a low level (first level, L), the switching unit 15 couples the input terminal set IN10 to the output terminal set OUT10. That is, the input terminals IT10~IT13 are coupled to the output terminals OT10~OT13, respectively. When the selection signal Sse1 is at a high level (second level, H), the switching unit 15 couples the input terminal set IN11 to the output terminal set OUT10. That is, the input terminals IT are coupled to the output terminals OT10~OT13, respectively. Moreover, the input terminals IT10 and IT11 of the input terminal set IN10 are coupled to the storage unit 14, and the input terminals IT12 and IT13 of the input terminal set IN10 are coupled to the processing unit 12. The output terminals OT10~OT13 of the output terminal set OUT10 are coupled to the signal T/R pins RX+, RX−, TX+, and TX−, respectively. The input terminals IT14~IT17 of the input terminal set IN11 are coupled to the processing unit 12.

The processing unit 12 performs the operation system of the electronic device 1. Moreover, the processing unit 12 can indicate the control unit 16 to control the level of the selection signal Sse1, thereby controlling the switching unit 15 to couple the input terminal set IN10 or IN11 to the output terminal set OUT10.

In an embodiment, when the control unit 16 is disabled, such as when the power of the electronic device 1 is exhausted, the selection signal Sse1 is at the low level. When the control unit 16 is enabled, the default level of the selection signal Sse1 is at a high level, and the control unit 16 is capable of changing the level of the selection Sse1 according to the indication from the processing unit 12.

The electronic device 1 has two states according to whether the power of the electronic device 1 is exhausted or not: a non-power-exhaustion state and a power-exhaustion state. When the electronic device 1 is in the non-power-exhaustion state, the charging unit 11 can provide a supply voltage V12 (shown in FIG. 3 and described later) and the operation voltage V10, such that the units or elements in the electronic device 1 can operate normally. When the electronic device 1 is in the power-exhaustion state, the charging unit 11 is unable to provide the supply voltage V12 to the voltage regulation unit 13 and unable to provide the operation voltage V10 to the processing unit 12. Thus, when the electronic device 1 is in the power-exhaustion state, the electronic device 1 requires a charging process (shown in FIGS. 2A and 2B), such that the charging unit 11 can once again provide the supply voltage V12 and the operation voltage V10. Moreover, at the power-exhaustion state, since the control unit 16 is unable to operate, the selection signal Sse1 controlled by the control unit 16 is at the low level (first level).

Note that, when the electronic device 1 is in the power-exhaustion state and the charging process is required to be performed, a voltage provided by an external power supply apparatus coupled to the electronic device 1 may not be appropriate for the electronic device 1. In order to prevent the electronic device 1 from being damaged by a large voltage provided from the external power supply apparatus, the charging process is divided into two stages. At the first stage (FIG. 2A), a relative small voltage (such 3.3V or 5V) which is enough for the voltage regulation unit 13 and the storage unit 14 to operate is provided. At this time, the electronic device 1 is not at a charging state yet. Then, an identification process is performed to determine whether a voltage provided by an external power supply apparatus at the second stage is appropriate for the electronic device 1 or not. If it is determined that the provided voltage is appropriate for the electronic device 1, then a relative large voltage (such as 19V) is provided during the second stage (FIG. 2B) for charging. At this time, the electronic device 1 is in the charging state.

Figure 2A:
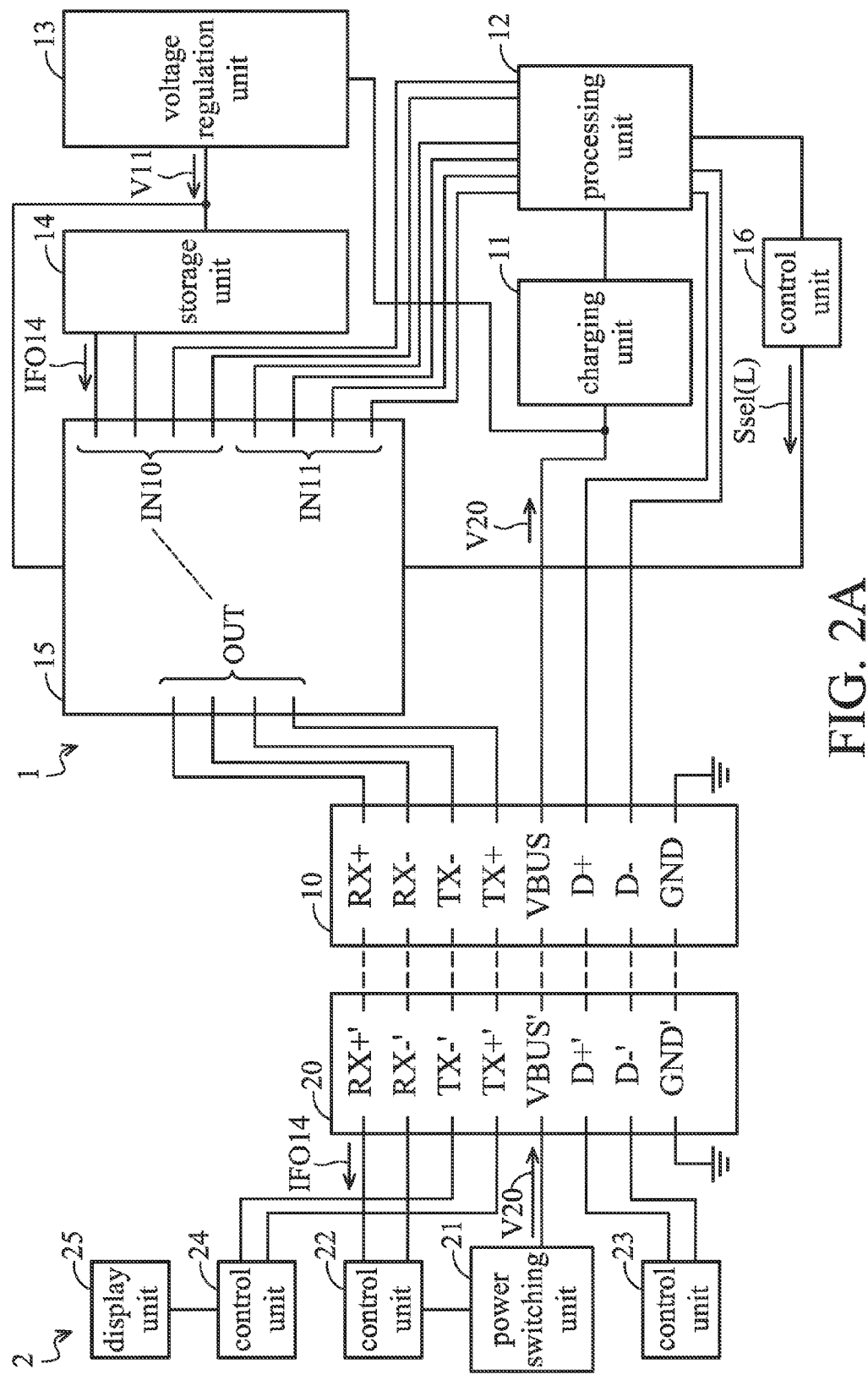
FIGS. 2A and 2B are schematic views showing a power supply device charging an electronic device of FIG. 1 in a power-exhaustion state according to an exemplary embodiment.

Referring to FIG. 2A, when the electronic device 1 is in the power-exhaustion state, an external power supply device 2, which is disposed outside of the electronic device 1, with a charging function can be coupled to the connection interface 10 to charge the electronic device 1. The electronic device 1 and the external power supply device 2 form an electronic system. As shown in FIG. 2A, the power supply device (external device) 2 comprises a connection interface 20, a power switching unit 21, and control units 22 and 23. The connection interface 20 corresponds to the connection interface 10 of the electronic device 1. Thus, the number of pins of the connection interface 20 is equal to the number of pins of the connection interface 10. According to the embodiment of FIG. 1, the connection interface 20 at least comprises signal T/R pins RX+', RX−', TX+', TX−', D+', and D−' and power pins VBUS' and GND' which correspond to the signal T/R pins RX+, RX−, TX+, TX−, D+, and D− and power pins VBUS and GND of the connection interface 10, respectively.

The signal T/R pins RX+' and RX−' of the connection interface 20 are coupled to the control unit 22, and the signal T/R pins D+' and D−' of the connection interface 20 are coupled to the control unit 23. The power pin VBUS' is coupled to the power switching unit 21. The power switching unit 21 initially provides a supply voltage V20 (such as a voltage of 5V). The control unit 22 is capable of controlling the power switching unit 21 to selectively switch, from providing the supply voltage V20, to providing a supply voltage V21 (such as a voltage of 19V, shown in FIG. 2B) to the power pin VBUS'. The control unit 23 stores device information IFO23 of the power supply device 2, such as a product identification code (PID), a vendor identification code (VID), and/or device description.

Referring to FIG. 2A again, the supply voltage V20 is provided to the charging unit 11. However, the supply voltage V20 is not enough for the charging unit 11 to operate and provide the operation voltage V10 to the processing unit 12 (this is because the voltage of 5V is too small). The voltage regulation unit 13 coupled to the power pin VBUS transforms the supply voltage V20 to the operation voltage V11 and provides the operation voltage V11 to the storage unit 14 and the switching unit 15 for operation (this is because the storage unit 14 and the switching unit 15 can operate by being powered by 5V or even 3.3V). Since the charging unit 11 can not be enabled, the control unit 16 is unable to operate, and the selection signal Sse1 controlled by the control unit 16 is at the low level (first level). According to the selection signal Sse1 with the low level, the switching unit 15 couples the input terminal set IN10 to the output terminal set OUT10. That is, the input terminals IT10~IT13 are coupled to the output terminals OT10~OT13, respectively. For clarity, FIG. 2A does not show the labels representing the input terminals and the output terminals, however, the arrangement and the labels of the input terminals and the output terminals are shown as FIG. 1. At this time, the device information IFO14 stored in the storage unit 14 is read to the control unit 22 via the input terminals IT10 and IT11, the output terminals OT10 and OT11, the signal T/R pins RX+ and RX−, and the signal T/R pins RX+' and RX−'. In the embodiment, the device information IFO14 stored in the storage unit 14 is read to the control unit 22 according to the I2C transfer protocol.

After the control unit 22 receives the device information IFO14 of the electronic device 1, the control unit 22 determines whether the device information IFO14 of the electronic device 1 conforms to preset information stored in the control unit 22 or not (the identification process). The determination result in which the device information IFO14 of the electronic device 1 conforms to the preset information stored in the control unit 22, such as the device information IFO14 comprising the supply voltage which can be received by the electronic device 1 being 19V and the preset information comprising the supply voltage which can be provided by the power supply device 2 being 19V, means that the electronic device 1 can be charged by the power supply device 2. The determination result in which the device information IFO14 of the electronic device 1 does not conform to the preset information stored in the control unit 22, such as the device information IFO14 comprising the supply voltage which can be received by the electronic device 1 being 12V and the preset information comprising the supply voltage which can be provided by the power supply device 2 being 19V, means that the electronic device 1 can not be charged by the power supply device 2. In this situation, the power supply device 2 stops operating or performing other operations, preventing the electronic device 1 from being damaged by an extremely large supply voltage provided by the power supply device 2.

Figure 2B:
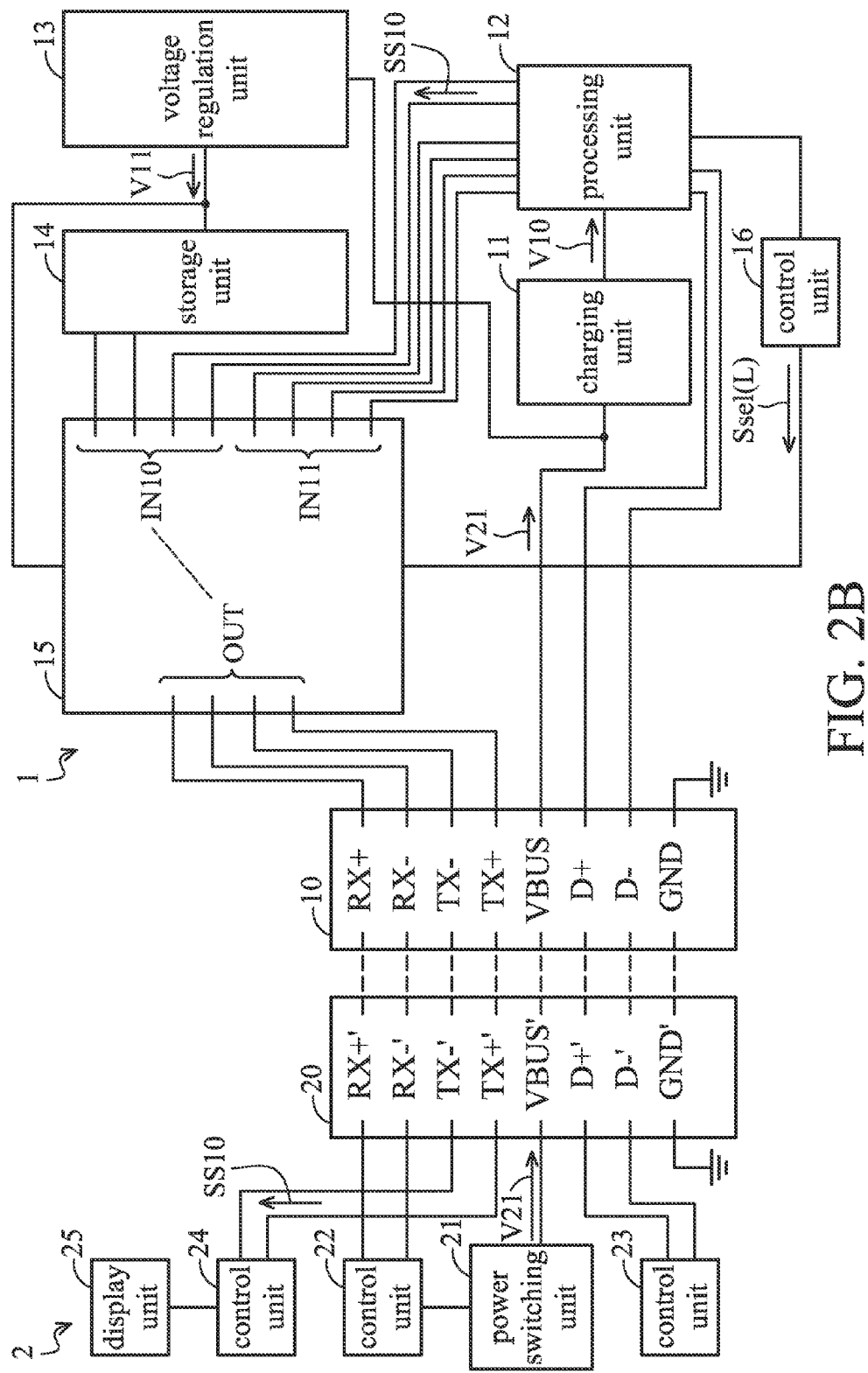

Referring to FIG. 2B, when the control unit 22 determines that the device information IFO14 of the electronic device 1 conforms to the preset information stored in the control unit 22, the control unit 22 controls the power switching unit 21 to switch to provide the supply voltage V21. The supply voltage V21 is provided to the power pin VBUS via the power pin VBUS'. At this time, the electronic device 1 enters the charging state. In the charging state, the charging unit 11 can operate to provide the operation voltage V10 to the processing unit 12. Simultaneously, the voltage regulation unit 13 can transform the supply voltage V21 to the operation voltage V11 for the storage unit 14 and the switching unit 15. Accordingly, the electronic device 1 is charged by the power supply device 2 and enters the charging state, such that the electronic device 1 can operate normally.

Referring to FIGS. 2A and 2B, in some embodiment, the power supply device 2 may further comprise a control unit 24 and a display unit 25. The control unit 24 is coupled to the signal T/R pins TX+' and TX−' of the connection interface 20. When electronic device 1 is in the charging state, the processing unit 12 can indicate the control unit 16 to keep the selection signal Sse1 at the low level, such that the input terminal set IN10 is continuously coupled to the output terminal set OUT10. The input terminals IT12 and IT13 of the input terminal set IN10 are coupled to the processing unit 12. Thus, the processing unit 12 can transmit the display signal set SS10 to the input terminals IT12 and IT13 and then to the control unit 24 via the output terminals OT12 and OT13, the signal T/R pins TX+ and TX−, and the signal T/R pins TX+' and TX−'. The control unit 24 controls the display unit 25, according to the display signal set SS10, to perform an image displaying operation. In other words, in the charging state, the display signal set SS10 can be provided to users for applications via the connection interface 10, such as a 3D-glasses application. In the embodiment, the display signal set SS10 can comprise signals eDP+ and eDP− with the embedded display port (eDP) specification. In some embodiments, the control units 22, 23, and 24 can be implemented by one single control unit. In other words, the one single control unit can perform the operations of the control units 22, 23, and 24.

In another embodiment, when the electronic device 1 is in the charging state, the processing unit 12 can indicate the control unit 16 to control the selection signal to be at the high level (second level, H), such that the input terminal set IN11 is coupled to the output terminal set OUT10. Since the input terminals IT14~IT17 of the input terminal set IN11 are coupled to the processing unit 12, the processing unit 12 can perform signal communication via the input terminals IT14~IT17, the output terminals OT10~OT13, the signal T/R pins RX+, RX−, TX+, and TX−, and the signal T/R pins RX+', RX−', TX+', and TX−'. In the embodiment, the signals between the processing unit 12 and the power supply device 2 are communicated according to the USB 3.0 transfer protocol.

Figure 3:
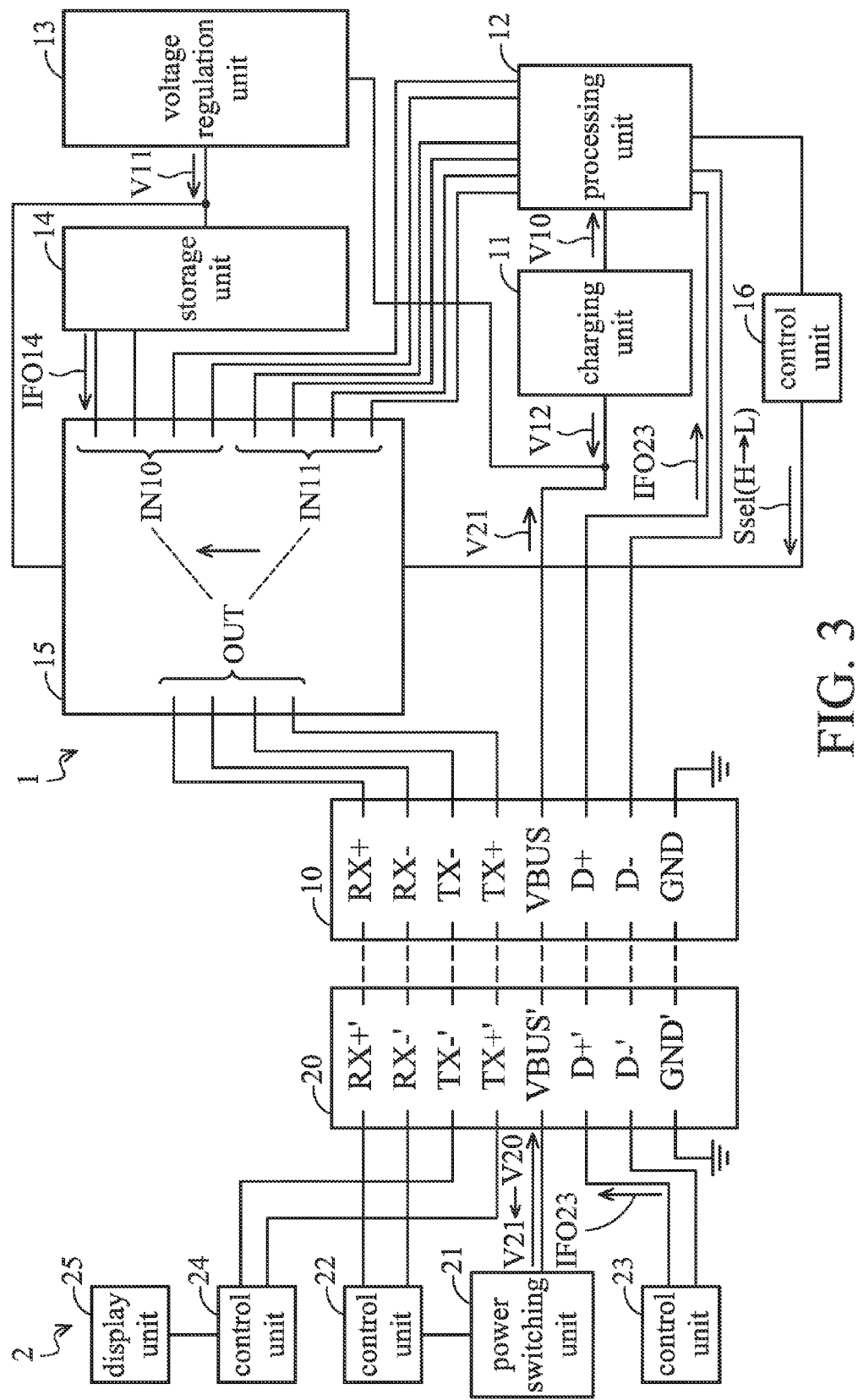
FIG. 3 is a schematic view showing a power supply device charging an electronic device of FIG. 1 at a non-power-exhaustion state according to an exemplary embodiment.

Referring to FIG. 3, when the electronic device 1 is in the non-power-exhaustion state, the power supply device 2 may be coupled to the electronic device 1 via the connection interface 10. Note that, in this situation, since the electronic device 1 is in the non-power-exhaustion state, the selection signal Sse1 is at the high level, which indicate that the input terminals IT14~IT17 are coupled to the output terminal OT10~OT13, respectively. The processing unit 12 powered by the operation voltage V10 reads the device information IFO23 from the control unit 23 via the signal T/R pins D+ and D− of the connection interface 10 and the signal T/R pins D+' and D−' of the connection interface 20. Then, the processing unit 12 determines whether the device information IFO23 of the power supply device 2 conforms to preset information stored in the processing unit 12 (the identification process). The determination result in which the device information IFO23 of the power supply device 2 conforms to the preset information stored in the processing unit 12 means that the electronic device 1 can be charged by the power supply device 2. The determination result in which the device information IFO23 of the power supply device 2 does not conform to the preset information stored in the processing unit 12 means, that the electronic device 1 can not be charged by the power supply device 2. In this situation, the power supply device 2 stops operating or performing other operations.

When the processing unit 12 determines that the device information IFO23 of the power supply device 2 conforms to the preset information stored in the processing unit 12, the processing unit 12 indicates the control unit 16 to change the selection signal Sse1 to be at the low level from the high level (H→L). The switching unit 15 couples the input terminals IT10~IT13 to the output terminals OT10~OT13, respectively, according to the selection signal Sse1 with the low level. At this time, the device information IFO14 stored in the storage unit 14 is read to the control unit 22 via the input terminals IT10 and IT11, the output terminals OT10 and OT11, the signal T/R pins RX+ and RX−, and the signal T/R pins RX+' and RX−'. Then, the control unit 22 and the power switching unit 21 perform the determination operation related to the device information IFO14 and the supply operation of the supply voltage V21 (V20→V21), as shown in FIGS. 2A and 2B. Next, the electronic device 1 enters the charging state described in the embodiment of FIGS. 2A and 2B. Since the embodiments of the charging state have already been described, the related description is omitted.

Figure 4:
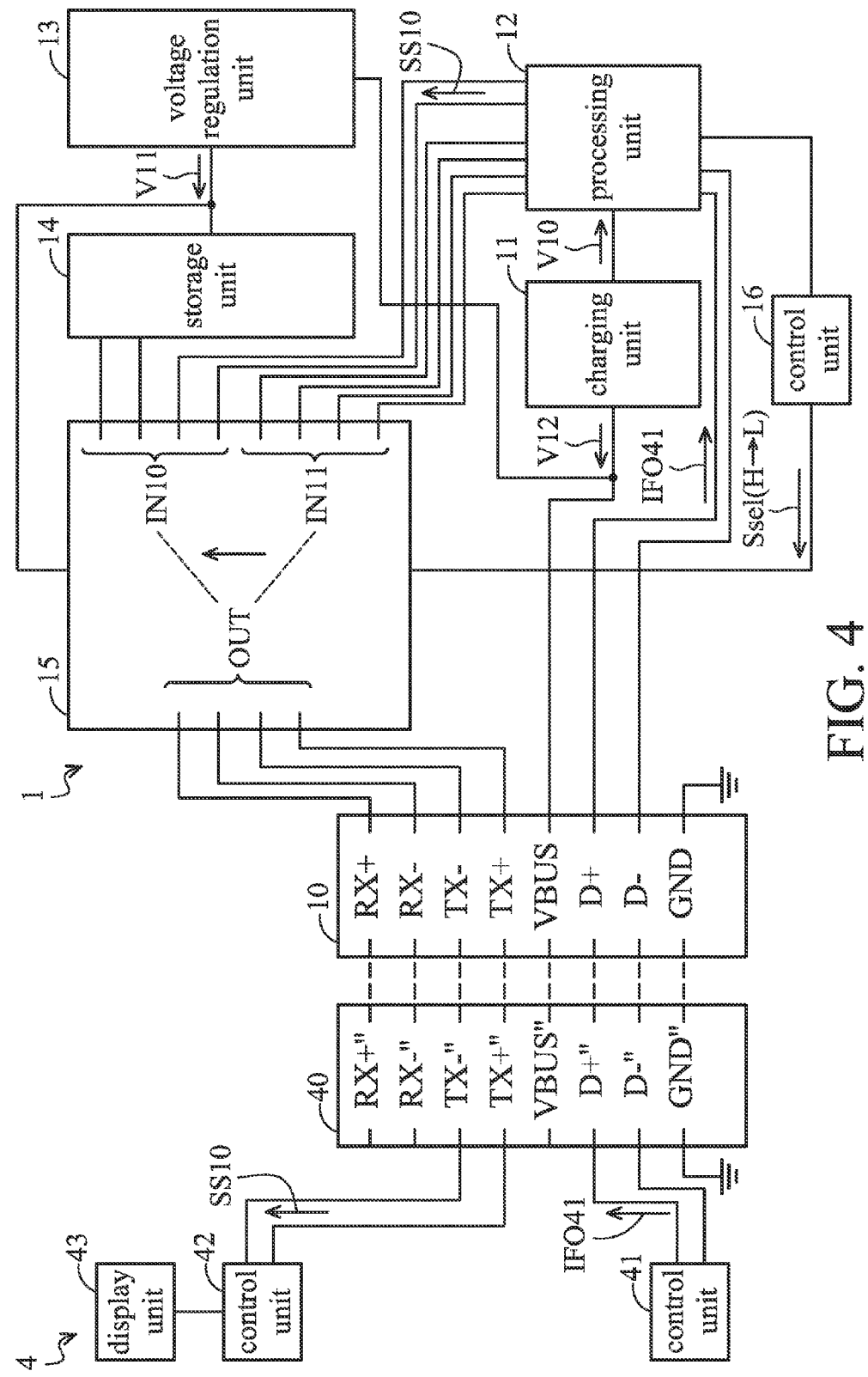
FIG. 4 is a schematic view showing signal communication between an external device having conformed device information and an electronic device of FIG. 1 at a non-power-exhaustion state according to an exemplary embodiment.

In some embodiments, when the electronic device 1 is in the non-power-exhaustion state, an external device which does not have a charging function but have device information conforming to the preset information stored in the processing unit 12 may be coupled to the electronic device 1 via the connection interface 10. Referring to FIG. 4, an external device 4 comprises a connection interface 40, control units 41 and 42, and a display unit 43. The control unit 41 stores device information IFO41 of the external device 4, such as a product identification code (PID), a vendor identification code (VID), and/or device description. The connection interface 40 corresponds to the connection interface 10 of the electronic device 1. Thus, the number of pins of the connection interface 40 is equal to the number of pins of the connection interface 10. The connection interface 40 at least comprises signal T/R pins RX+", RX−", TX+", TX−", D+", and D−" and power pins VBUS" and GND" which correspond to the signal T/R pins RX+, RX−, TX+, TX−, D+, and D− and power pins VBUS and GND of the connection interface 10, respectively.

When the electronic device 1 is in the non-power-exhaustion state, the processing unit 12 powered by the operation voltage V10 reads the device information IFO41 from the control unit 41 via the signal T/R pins D+ and D− of the connection interface 10 and the signal T/R pins D+" and D−" of the connection interface 40. Then, the processing unit 12 determines whether the device information IFO41 of the external device 4 conforms to the preset information stored in the processing unit 12 or not. The determination result in which the device information IFO41 of the external device 4 conforms to the preset information stored in the processing unit 12 means that specific signal communication can be performed between the electronic device 1 and the external device 4. The determination result in which the device information IFO41 of the external device 4 does not conform to the preset information stored in the processing unit 12 means that specific signal communication can not be performed between the electronic device 1 and the external device 4. In this situation, the external device 4 stops operating.

When the processing unit 12 determines that the device information IFO41 of the control unit 41 conforms to the preset information stored in the processing unit 12, the processing unit 12 indicates the control unit 16 to change the selection signal Sse1 to the low level from the high level (H·L). The switching unit 15 couples the input terminals IT10~IT13 to the output terminals OT10~OT13, respectively, according to the selection signal Sse1 with the low level. The input terminals IT12 and IT13 are coupled to the processing unit 12. Thus, the processing unit 12 can transmit the display signal set SS10 to the input terminals IT12 and IT13 and then to the control unit 42 via the output terminals OT12 and OT13, the signal T/R pins TX+ and TX−, and the signal T/R pins TX+" and TX−". The control unit 42 controls the display unit 25, according to the display signal set SS10, to perform an image displaying operation. In the embodiment, the display signal set SS10 can comprise signals eDP+ and eDP− with the embedded display port (eDP) specification.

Figure 5:
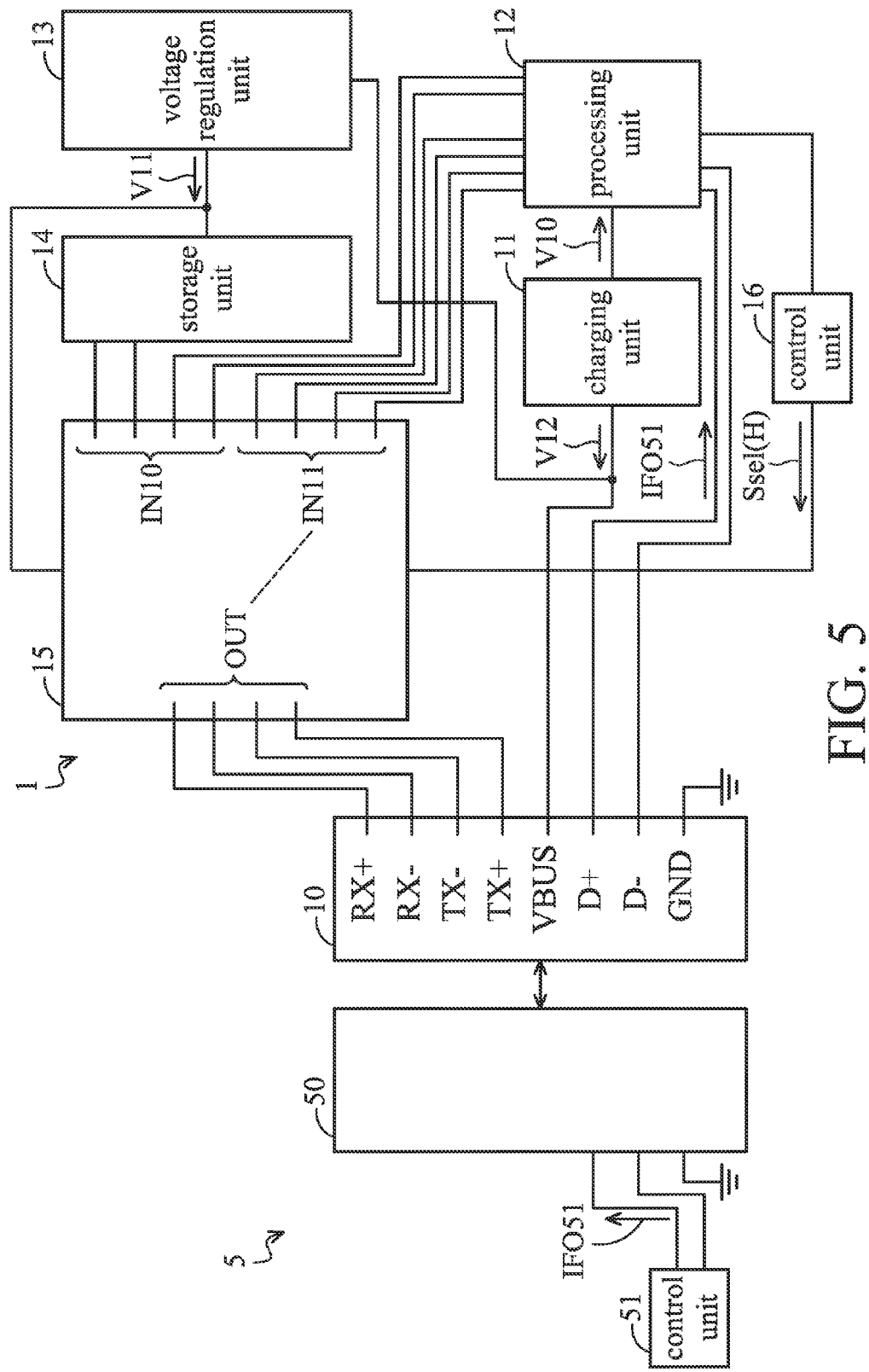
FIG. 5 is a schematic view showing signal communication between an external device without conformed device information and an electronic device of FIG. 1 at a non-power-exhaustion state according to an exemplary embodiment.

In other embodiments, when the electronic device 1 is in the non-power-exhaustion state, an external device which does not have a charging function and does not have device information conforming to the preset information stored in the processing unit 12 may be coupled to the electronic device 1 via the connection interface 10. Referring to FIG. 5, an external device 5 comprises a connection interface 50 and a control unit 51. The control unit 51 stores device information IFO51 of the external device 5, such as a product identification code (PID), a vendor identification code (VID), and/or device description. The connection interface 50 corresponds to the connection interface 10 of the electronic device 1. Thus, the connection interface 50 is a connection port conforming to the USB 3.0 transfer protocol.

When the electronic device 1 is in the non-power-exhaustion state, the processing unit 12 powered by the operation voltage V10 reads the device information IFO51 from the control unit 51 via the signal T/R pins D+ and D− of the connection interface 10 and the connection interface 50. Then, the processing unit 12 determines that the device information IFO51 of the external device 5 does not conform to the preset information stored in the processing unit 12. The processing unit 12 indicate the control unit 16 to control the selection signal to be kept at the high level, such that the input terminals IT14~IT17 are coupled to the output terminals OT10~OT13, respectively. At this time, the processing unit 12 and the external device 5 can perform signal communication of the USB 3.0 transfer protocol via the input terminals IT14~IT17, the output terminals OT10~OT13, and the signal T/R pins RX+, RX−, TX+, and TX−. Alternatively, the processing unit 12 and the external device 5 can perform signal communication of the USB 2.0 transfer protocol via the signal T/R pins D+ and D−.

According to the above description, the electronic device 1 of the proposed embodiments comprises a connection interface 10 capable of receiving a supply voltage and further transmitting and receiving signals. Particularly, when the power supply device 2 with the device information conforming to the preset information is coupled to the electronic device 1, the power supply device 2 can charge the electronic device 1 via the connection interface 10 which supports the USB 3.0 transfer protocol. Moreover, the electronic device 1 may perform signal communication of the USB 3.0 and 2.0 with an external device. Thus, the connection interface 10 supports signal communications and the charging operation, thereby increasing the space available for the arrangement of input/output connection ports in the electronic device 1.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device coupled to a first external device with a charging function, comprising
    a connection interface comprising a power pin and a first signal transmitting/receiving (T/R) pin set;
    a voltage regulation unit coupled to the power pin;
    a storage unit, coupled to the voltage regulation unit and powered by a first operation voltage, for storing first device information of the electronic device;
    a charging unit coupled to the power pin;
    a processing unit, coupled to the charging unit and powered by a second operation voltage, for performing a system operation of the electronic device; and
    a switching unit, powered by the first operation voltage, for receiving a selection signal, and comprising a first input terminal set coupled to the storage unit, a second input terminal set coupled to the processing unit, and an output terminal set coupled to the first signal T/R pin set,
    wherein when the electronic device is in a power-exhaustion state and the first external device is coupled to the connection interface to provide a first supply voltage to the power pin, the voltage regulation unit transforms the first supply voltage to the first operation voltage, and the switching unit couples the first input terminal set to the output terminal set according to the selection signal to transmit the first device information to the first external device via the first signal T/R pin set,
    wherein when the first external device provides a second supply voltage to the power pin in response to the first device information, the electronic device is in a charging state,
    wherein in the charging state, the charging unit provides the second operation voltage according to the second supply voltage; wherein the connection interface further comprises a second signal transmitting/receiving (T/R) pin set coupled to the processing unit, and wherein when the electronic device is in a non-power-exhaustion state and a second external device is coupled to the connection interface, the processing unit reads second device information from the second external device via the second signal T/R pin set to determine whether the second device information conforms to preset information or not, and wherein when the processing unit determines that the second device information conforms to the preset information, the switching unit couples the first input terminal set to the output terminal set.

2. The electronic device as claimed in claim 1 further comprising:
    a control unit, coupled to the processing unit, for controlling the selection signal,
    wherein when the electronic device is in the power-exhaustion state, the selection signal is at a first level to control the switching unit to couple the first input terminal set to the output terminal set, and
    wherein when the electronic device is in a non-power-exhaustion state, the control unit is indicated by the processing unit to control the selection signal to be at the first level or control the selection signal to be at a second level to couple the second input terminal set to the output terminal set.

3. The electronic device as claimed in claim 2,
    wherein the connection interface further comprises a second signal transmitting/receiving (T/R) pin set coupled to the processing unit,
    wherein when the electronic device is in the non-power-exhaustion state and a second external device is coupled to the connection interface, the processing unit reads second device information from the second external device via the second signal T/R pin set to determine whether the second device information conforms to the preset information or not,
    wherein when the processing unit determines that the second device information conforms to the preset information, the processing unit indicates the control unit to control the selection to be at the first level, and
    wherein when the processing unit determines that the second device information does not conform to the preset information, the processing unit indicates the control unit to control the selection to be at the second level.

4. The electronic device as claimed in claim 3, wherein when the processing unit determines that the second device information does not conform to the preset information, the electronic device performs signal communication between the processing unit and the second external device via the first signal T/R pin set.

5. The electronic device as claimed in claim 1,
    wherein when the processing unit determines that the second device information conforms to the preset information, the switching unit transmits the first device information to the second external device via the first signal T/R pin set, and
    wherein when the second external device provides the second supply voltage to the power pin in response to the first device information, the electronic device is in the charging state.

6. The electronic device as claimed in claim 5,
    wherein the first input terminal set is further coupled to the processing unit, and
    wherein in the charging state, the processing unit transmits a display signal set to the second external device via the first signal T/R pin set.

7. The electronic device as claimed in claim 1,
    wherein the first input terminal set is further coupled to the processing unit, and
    wherein in the charging state, the processing unit transmits a display signal set to the first external device via the first signal T/R pin set.

8. The electronic device as claimed in claim 1,
    wherein the first input terminal set is further coupled to the processing unit, and wherein when the processing unit determines that the second device information conforms to the preset information, the processing unit transmits a display signal set to the second external device via the first signal T/R pin set.

9. The electronic device as claimed in claim 1, wherein when the processing unit determines that the second device information does not conform to the preset information, the switching unit couples the second input terminal set to the output terminal set, and the electronic device performs signal communication between the processing unit and the second external device via the first signal T/R pin set.

10. The electronic device as claimed in claim 1, wherein the connection interface is a connection port conforming to the Universal Serial Bus 3.0 (USB 3.0) transfer protocol.

* * * * *